(12) United States Patent
Inoguchi et al.

(10) Patent No.: US 6,337,672 B1
(45) Date of Patent: Jan. 8, 2002

(54) COMBINED DISPLAY PANEL

(75) Inventors: Kazuhiro Inoguchi, Toyota; Kunitomo Aoki, Niwa-gun; Nobuei Ito, Chiryu; Tadashi Hattori, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/228,417

(22) Filed: Jan. 12, 1999

(30) Foreign Application Priority Data

Jan. 30, 1998 (JP) .......................................... 10-019615

(51) Int. Cl.⁷ .............................. G02B 5/22; G09G 5/00
(52) U.S. Cl. .............................. 345/1.1; 345/3.1; 345/5; 359/885
(58) Field of Search .............................. 345/1, 3, 5, 1.1, 345/3.1; 359/885, 888, 614

(56) References Cited

U.S. PATENT DOCUMENTS

| | | | | |
|---|---|---|---|---|
| 3,689,835 A | * | 9/1972 | Bickfrod ..................... | 324/115 |
| 4,245,242 A | * | 1/1981 | Treka ......................... | 348/816 |
| 5,173,808 A | * | 12/1992 | Auer et al. ................. | 359/722 |
| 5,578,985 A | * | 11/1996 | Cremers et al. ............ | 340/461 |
| 5,834,122 A | * | 11/1998 | Teng et al. ................. | 428/412 |
| 5,920,256 A | * | 7/1999 | Toffolo et al. .............. | 340/461 |

FOREIGN PATENT DOCUMENTS

JP          10-504101          4/1998

* cited by examiner

*Primary Examiner*—Steven Saras
*Assistant Examiner*—William C. Spencer
(74) *Attorney, Agent, or Firm*—Pillsbury Winthrop LLP

(57) ABSTRACT

A second display panel having a lower luminance is combined with a first display panel having a higher luminance, forming a combined display panel. The entire surface of the combined display panel is covered with a dimming filter for ornamental purpose. Transparency of the dimming filter is enhanced in a wave-length region of the light emitted from the second panel to alleviate a brightness imbalance between the first and second panels. The transparency is enhanced also in another wave-length region corresponding to light complementary to the light emitted from the second panel, so that a color shift of the display of the first panel is avoided. Preferably, an electroluminescent display panel which emits light having a sharp peak in a specific wave-length region is used as the second panel.

11 Claims, 6 Drawing Sheets

_US 6,337,672 B1_

COMBINED DISPLAY PANEL

CROSS-REFERENCE TO RELATED APPLICATION

This application is based upon and claims benefit of priority of Japanese Patent Application No. Hei-10-19615 filed on Jan. 30, 1998, the content of which is incorporated herein by reference.

BACKGROUND OF THE INVENTION

1. Field of the Invention

The present invention relates to a combined display panel in which a second display panel is combined with or overlapped on a first display panel. Such a combined display panel is used as a combination instrument panel for an automobile, a train or an airplane.

2. Description of Related Art

A combined display panel to be used as an automobile instrument panel in which an additional display panel such as an electroluminescent panel is combined with a conventional display panel has been proposed hitherto. The additional display panel serves to display various information which has been necessitated in recent years in addition to conventional information such as vehicle speed, engine speed, amount of fuel and coolant temperature. An instrument panel of an automobile, especially of a high grade automobile, is covered with a dimming filter having a low transparency for a design purpose. Such an instrument panel is sometimes referred to as a black-out meter. In this case, high luminance of display is required to show information clearly. Usually, the additional display panel such as an electroluminescent panel does not have a sufficiently high luminance for the black-out meter. It is possible to make an electroluminescent panel having such a high luminance, but it becomes expensive. In addition, a high power is consumed if such a high luminance panel is used.

SUMMARY OF THE INVENTION

The present invention has been made in view of the above-mentioned problem, and an object of the present invention is to provide a combined display panel, in which a second display panel having luminance lower than that of a first display panel is used and yet a display of the second panel is clearly visible through a low transparency dimming filter.

A whole display surface of the combined display panel having a first panel and a second panel, luminance of which is lower than that of the first panel, is covered with a dimming filter having low transparency for an ornamental design purpose. Transparency of the dimming filter is made high in a wave-length region of the light emitted from the second panel, so that brightness imbalance between the first and second panels is alleviated or eliminated. Also, the transparency of the dimming filter is made high in another wave-length region of light, color of which is complementary to the color of the light emitted from the second panel, so that color shift in the display of the first panel is avoided. In this manner, the brightness imbalance and the color shift are avoided at the same time. Preferably, the level of the transparency of the dimming filter in the two wave-length regions in which it is enhanced is made higher than an average transparency level in a wave-length region covering a whole visible light. It is also preferable to make both transparency levels enhanced in two wave-length regions equal so that the color shift in the display of the first panel is further reduced to substantially zero.

A multi-color or a full color display panel may be used as the second panel which is combined with the first panel. In this case, the transparency of the dimming filter is made higher than the average transparency, in color regions covering the light emitted from the multi-color or full color display panel. Preferably, the transparency is made higher also in the color region complementary to the emitted light. Color filters may be used to constitute the multi-color or full color display panel.

To further enhance the advantage of the dimming filter having a high transparency in a specific wave-length region, it is most preferable to use a display panel, as the second panel, which emits light having a sharp peak in that specific wave-length region, such as an electroluminescent panel. Such an electroluminescent panel may be transparent or non-transparent. If the transparent panel is used, it may be overlapped on a part of the first panel, and if the non-transparent panel is used, it may be mounted on the first panel at a place where it does not interfere with the display of the first panel.

Other objects and features of the present invention will become more readily apparent from a better understanding of the preferred embodiments described below with reference to the following drawings.

DETAILED DESCRIPTION OF THE PREFERRED EMBODIMENTS

Figure 1:
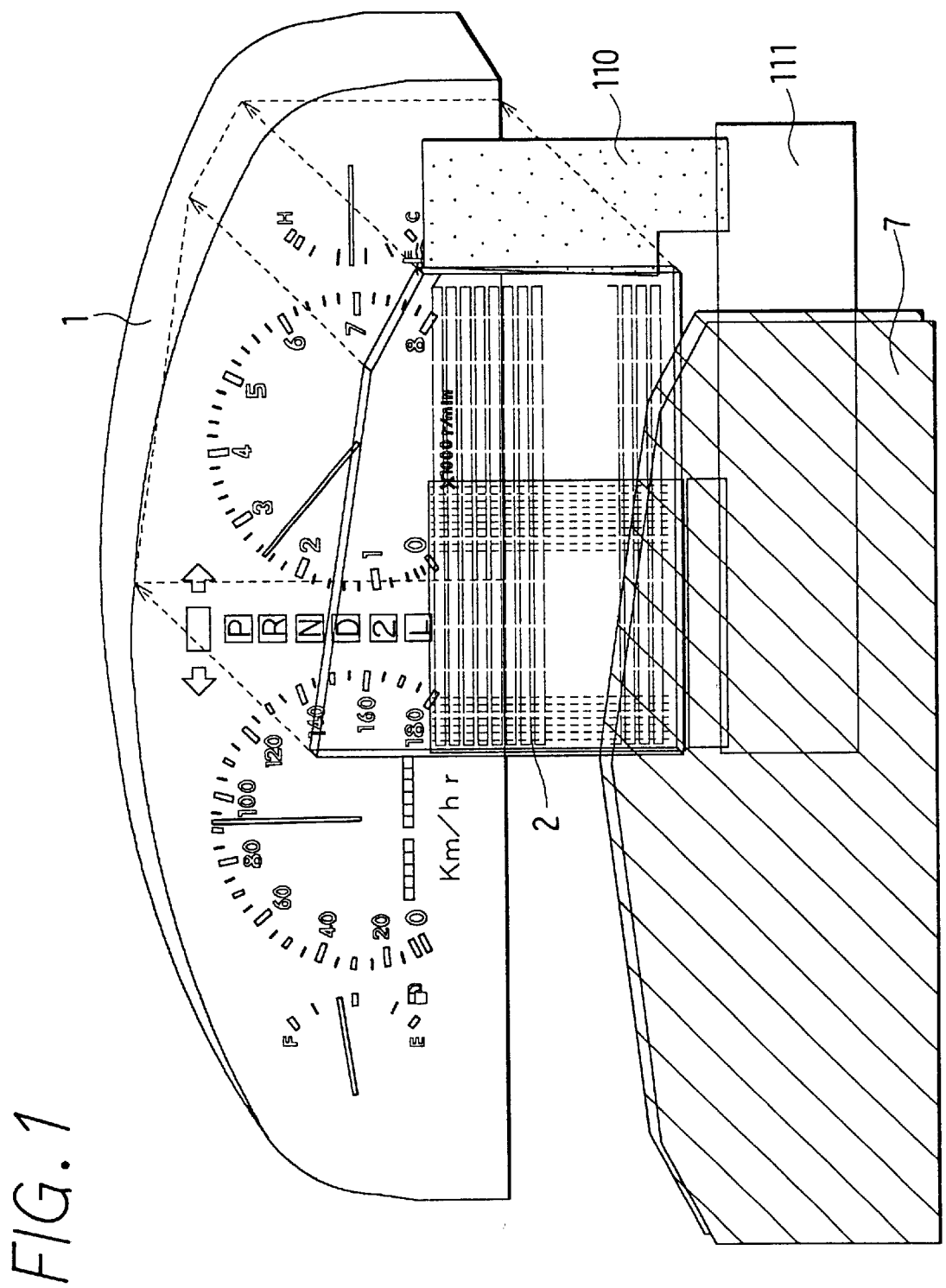
FIG. 1 is a perspective view showing a combined display panel as a first embodiment of the present invention, with a second display panel and a dimming filter separated from a first display panel.

A first embodiment of the present invention will be described, referring to FIGS. 1–5. As shown in FIG. 1, a combined display panel is composed of a first display panel 1, which is a conventional instrument panel for an automobile, a second display panel 2, which is a transparent electroluminescent panel (hereinafter referred to as an EL panel), and a dimming filter 7. The second display panel 2 is overlapped on a right half surface of the first display panel 1, and a circuit board 111 for controlling the second display panel 2 is disposed inside the first display panel 1. The second display panel 2 and the circuit board 111 are electrically connected through a flexible wiring sheet 110.

Figure 2:
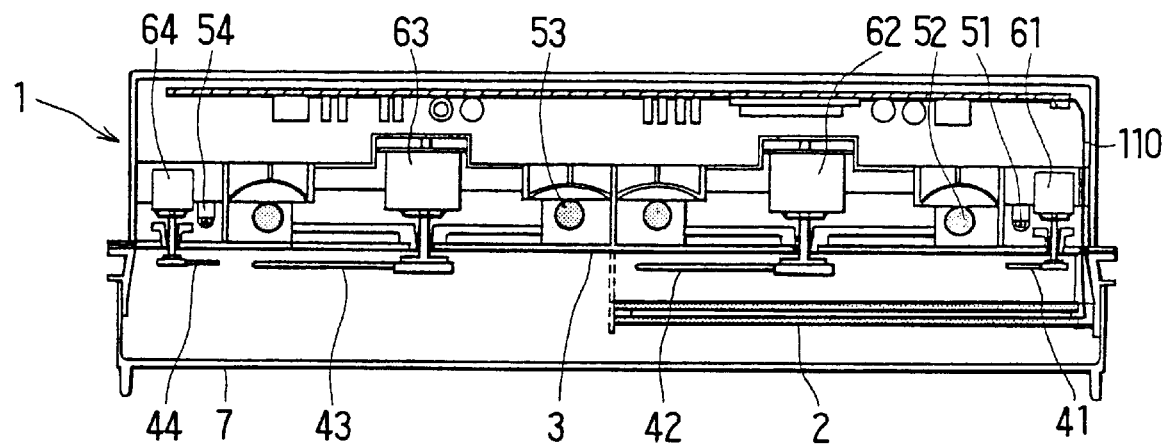
FIG. 2 is a cross-sectional view showing the combined display panel, viewed from the top of FIG. 1.
Figure 3:
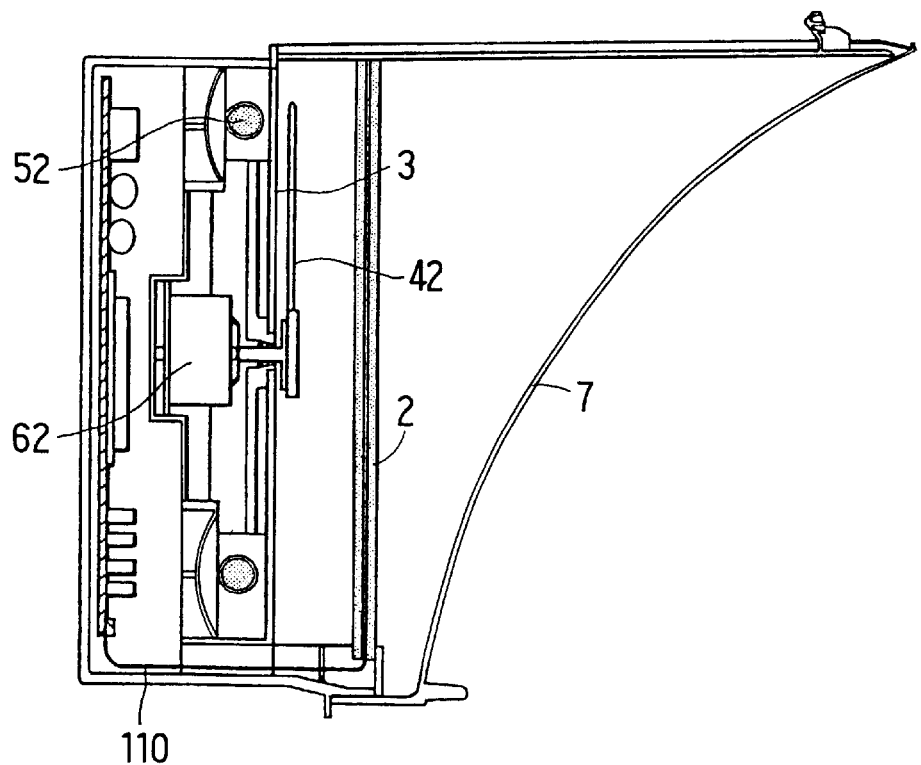
FIG. 3 is a cross-sectional view showing the combined display panel, viewed from the left side of FIG. 1.

As shown in FIG. 2, the first display panel 1 includes a coolant temperature meter having its pointer 41, a tachometer having its pointer 42, a speedometer having its pointer 43 and a fuel meter having its pointer 44. Scales and letters are printed on a display plate 3. The coolant temperature meter, the tachometer, the speedometer and the fuel meter are driven by respective drivers 61–64 and illuminated by respective illuminating lamps 51–54. The second display panel 2 is disposed in front of the right half surface of the first display panel 1. As shown in FIG. 3 showing a cross-sectional side view of the combined display panel, the dimming filter 7 having a curvature covers a whole front surface of the combined display panel with a certain distance therefrom.

Figure 4:
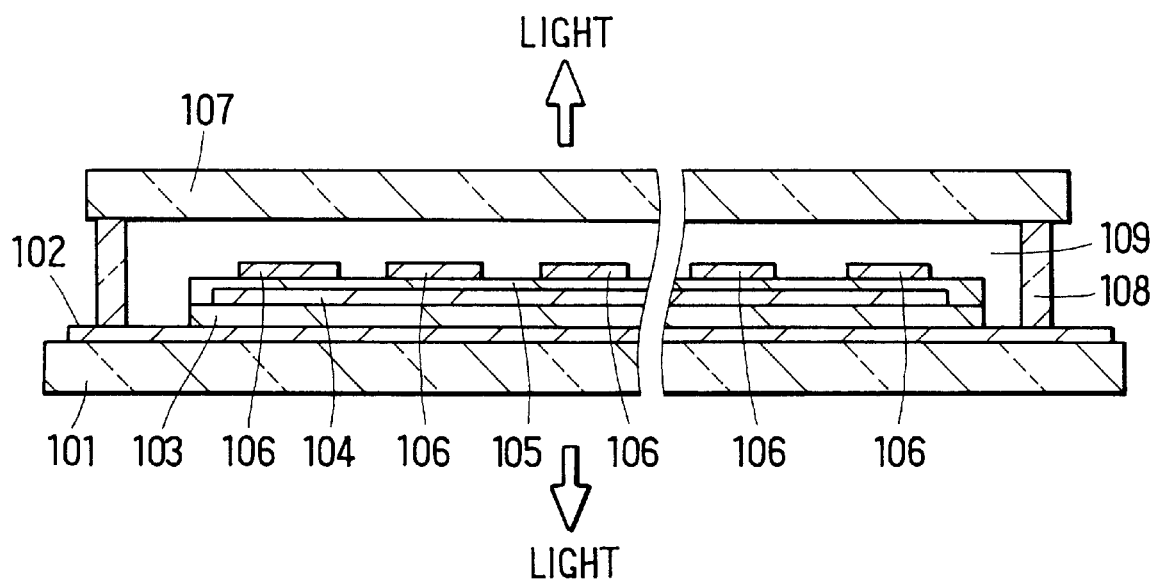
FIG. 4 is a cross-sectional view showing an electroluminescent panel used as the second display panel.

The second display panel 2 which is a transparent EL panel has a structure as shown in FIG. 4. On a first glass substrate 101, first transparent electrodes 102, a first insulation layer 103, a luminescent layer 104, a second insulation layer 105 and second transparent electrodes 106 are laminated in this order. A second glass substrate 107 is supported by a spacer 108 on the first glass substrate 101 with a certain space therebetween. The space is filled with silicone oil 109 and hermetically sealed. The first transparent electrodes 102 and the second transparent electrodes 106 are plural stripes made of a transparent conductive material such as ITO (indium-oxide, tin). The second transparent electrodes 106 are disposed in a direction perpendicular to the first transparent electrodes 102, so that both electrodes form a matrix, and pixels are formed at each intersection of both electrodes. The first and second insulation layers 103, 105 are made of a transparent insulating material such as $Ta_2O_5$ (tantalum-oxide). The luminescent layer 104 is made of a luminescent material such as ZnS:Mn (manganese-added zinc-sulfur). The luminescent layer 104 is sandwiched between the first and second insulation layers 103, 105 and insulated from both electrodes 102, 106. Light from the luminescent layer 104 is emitted from both glass substrates 101, 107. The EL panel is made by a known and conventional process. An EL panel having elements made of an organic material may be used as the second display panel 2 in place of the EL panel described above.

As shown in FIGS. 1–3, the EL panel as the second display panel 2 is disposed in a front of the right half of the first display panel 1, and is driven and controlled by the circuit board 111 disposed inside the first display panel 1. The EL panel and the circuit board 111 are electrically connected by the flexible wiring sheet 110. Thus, the first display panel 1 and the second display panel 2 constitute a combined display panel. The dimming filter 7 disposed to cover a whole surface of the combined display panel serves to make invisible unnecessary portions of the panel such as connections, and also serves to make the EL panel invisible when it is not lit. The transparency of the dimming filter 7 is made very low to enhance ornamental design of the combined display panel. When both of the first and second display panels 1, 2 are not lit, the whole surface of the combined display panel looks very dark, showing nothing thereon. When either the first or the second display panel is lit, information displayed thereon comes out clearly from the dark surface. Usually, only the first display panel 1 is lit to show information necessary for driving a vehicle, such as vehicle speed, engine speed, coolant temperature and amount of fuel in the tank. When the EL panel as the second display panel 2 is lit for displaying special information such as a warning, the display of the tachometer 42 is switched off by turning off the lamp 52 illuminating the tachometer. In other words, both the displays of the tachometer and the EL panel are interchangeably switched.

Figure 5:
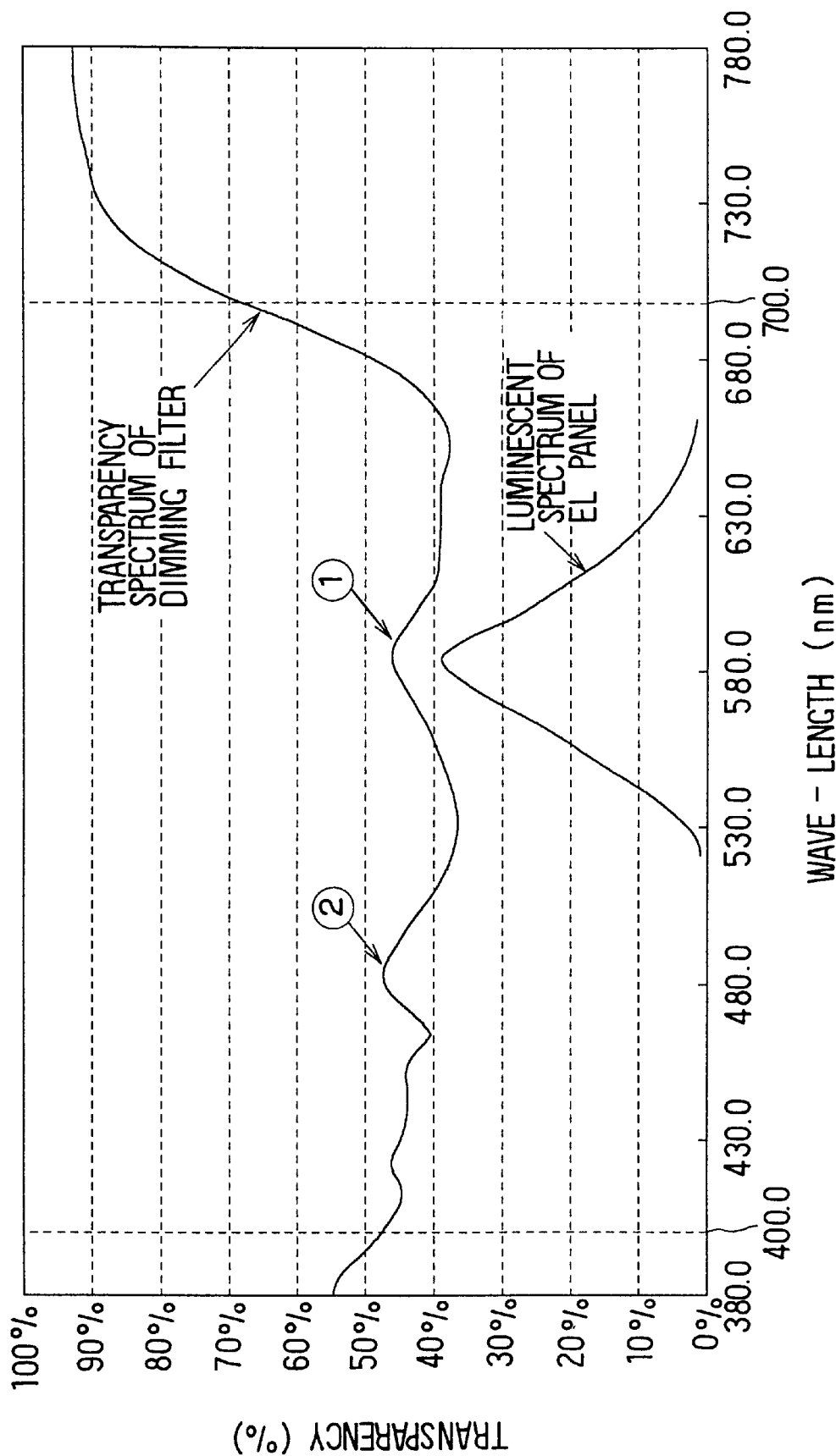
FIG. 5 is a graph showing a transparency spectrum of the dimming filter and a luminescent spectrum of the electroluminescent panel.

The dimming filter 7 having a transparency characteristic as shown in FIG. 5 is used in this embodiment.

In FIG. 5, wave-length is shown on the abscissa and the transparency in percentage is shown on the ordinate. The light spectrum emitted from the EL panel is also shown in the graph of FIG. 5. The light spectrum emitted from the luminescent layer 104 (ZnS:Mn) has a peak in a wave-length region around 580 nm (a first wave-length region). The dimming filter 7 is designed so that it has a transparency peak (designated by ①) in the graph) in the first wave-length region. The dimming filter 7 also has another transparency peak (designated by ②) in a second wave-length region in which a light color is in a complementary relation to the light color in the first wave-length region. In other words, the transparency of the dimming filter 7 is made higher than an average transparency of visible light (wave-length region: 400 nm–700 nm) both in the first and the second wave-length regions.

The luminance of the EL panel as the second display panel 2 is lower than the luminance of the first display panel 1. When the EL panel 2 is lit together with the left half of the first display panel 1, the light emitted from the EL panel 2 is attenuated by the dimming filter 7 less than the light from the first display panel 1, because the transparency of the dimming filter 7 is high in the wave-length region (the first wave-length region) of the light emitted from the EL panel. Therefore, brightness of the EL panel 2 can be sufficiently high relative to that of the first display panel 1, even if the luminance of the EL panel 2 is lower than that of the first display panel 1.

If the transparency of the dimming filter 7 is high only in the first wave-length region, the light color of the first display panel 1 will be shifted toward the light color emitted from the EL panel 2. To avoid the color shift as such, the transparency of the dimming filter 7 is made high also in the second wave-length region. The color of the light having wave-length of the second wave-length region is in a complementary relation with the color of the light having wave-length of the first wave-length region. By mixing a color with a complementary color, a white color is realized as is well known. In this manner, the color shift of the first display panel 1 is eliminated. Preferably, the transparency of the dimming filter 7 in the first wave-length region and that in the second wave-length region are made substantially equal in order to make the color shift substantially zero. By using the dimming filter 7 having the transparency distribution described above, the brightness imbalance between the first display panel 1 and the EL panel 2 is alleviated, and the color shift of the first display panel 1 is avoided at the same time.

Figure 6A:
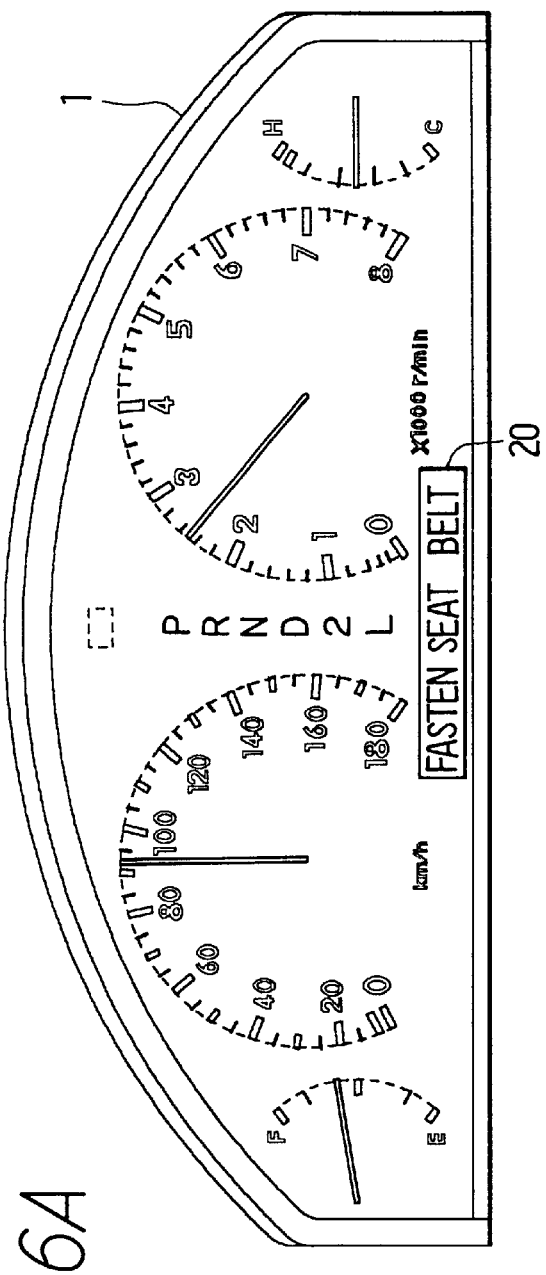
FIG. 6A is a perspective view showing a combined display panel as a second embodiment of the present invention.
Figure 6B:
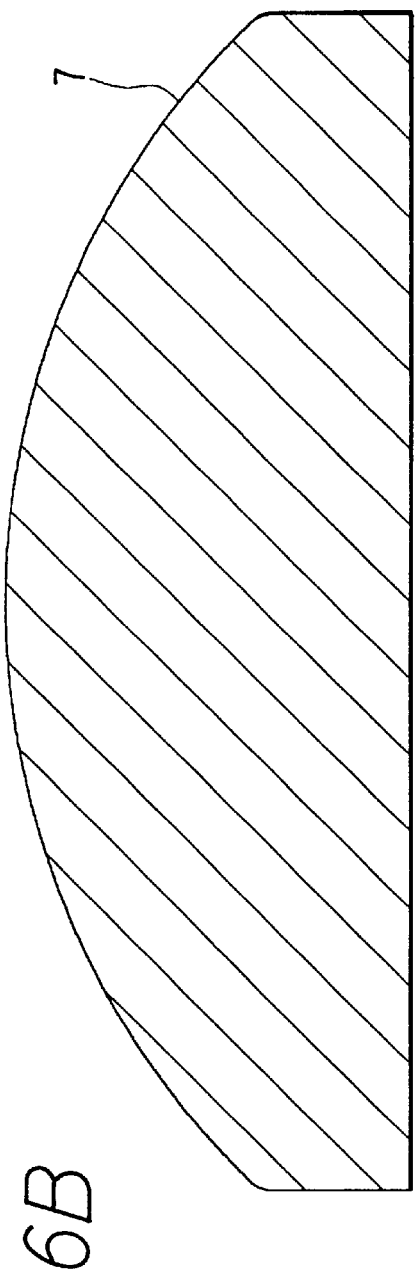
FIG. 6B is a plan view showing a dimming filter to cover a front surface of the combined display panel shown in FIG. 6A.

A second embodiment of the present invention will be described, referring to FIGS. 6A, 6B and 7. In the second embodiment, a non-transparent EL panel 20 is used as the second display panel in place of the transparent EL panel. As shown in FIG. 6A, the non-transparent EL panel 20 is combined with the first display panel 1, forming a combined display panel. The non-transparent EL panel 20 is disposed on the surface of the first display panel 1 at a place where the non-transparent EL panel 20 does not interfere with the display of the first display panel 1. The non-transparent EL panel 20 displays additional information including a warning such as "fasten seat belt." A dimming filter 7 having a special transparency distribution (which will be explained later) covers a whole surface of the combined display panel.

Figure 7:
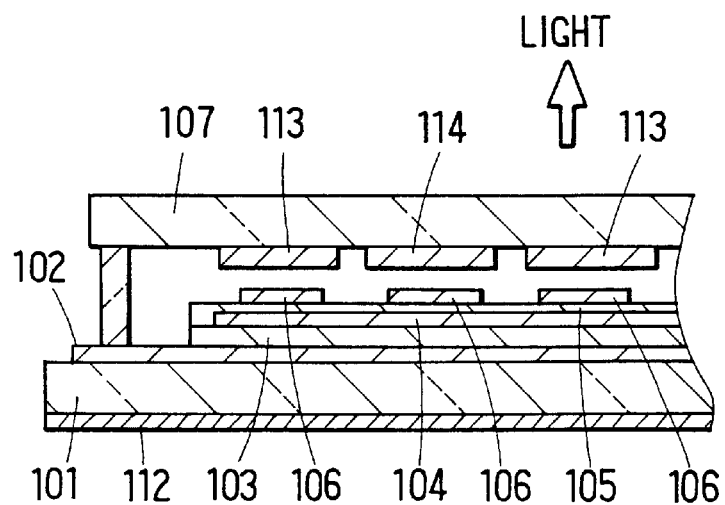
FIG. 7 is a partial cross-sectional view showing a non-transparent electroluminescent panel used in the combined display panel shown in FIG. 6A.

A structure of the non-transparent EL panel 20 is shown in FIG. 7. The structure is mostly the same as that of the transparent EL panel shown in FIG. 4, except that a black background layer 112 is additionally disposed on the surface of the first glass substrate 101, and that red-filters 113 and green-filters 114 are disposed on the inner surface of the second glass substrate 107 at positions corresponding to EL pixels. The light emitted from the luminescent layer 104 toward the first glass substrate 101 is interrupted by the black background layer 112, and the light emitted toward the second glass substrate 107 comes out through the respective red-filters 113 and green-filters 114. The non-transparent EL panel 20 is placed on the surface of the first display panel 1 so that the second glass substrate 107 faces a viewer. The non-transparent EL panel 20 displays multi-color images, i.e., red and green.

The dimming filter 7 used in the second embodiment is designed so that its transparency is high in red and green light regions. That is, its transparency in the regions of red and green light is higher than an average transparency in a whole visible light region. The relatively low luminance of the non-transparent EL panel 20 is compensated by the dimming filter 7 in the same manner as in the first embodiment. Preferably, the transparency of the dimming filter 7 is made high also in a region of blue light which is complementary to red and green light, so that the color shift of the first display panel 1 is avoided. As the second display panel of the second embodiment, a liquid crystal display panel having an illuminating light source may be used in place of the non-transparent EL panel 20.

Figure 8:
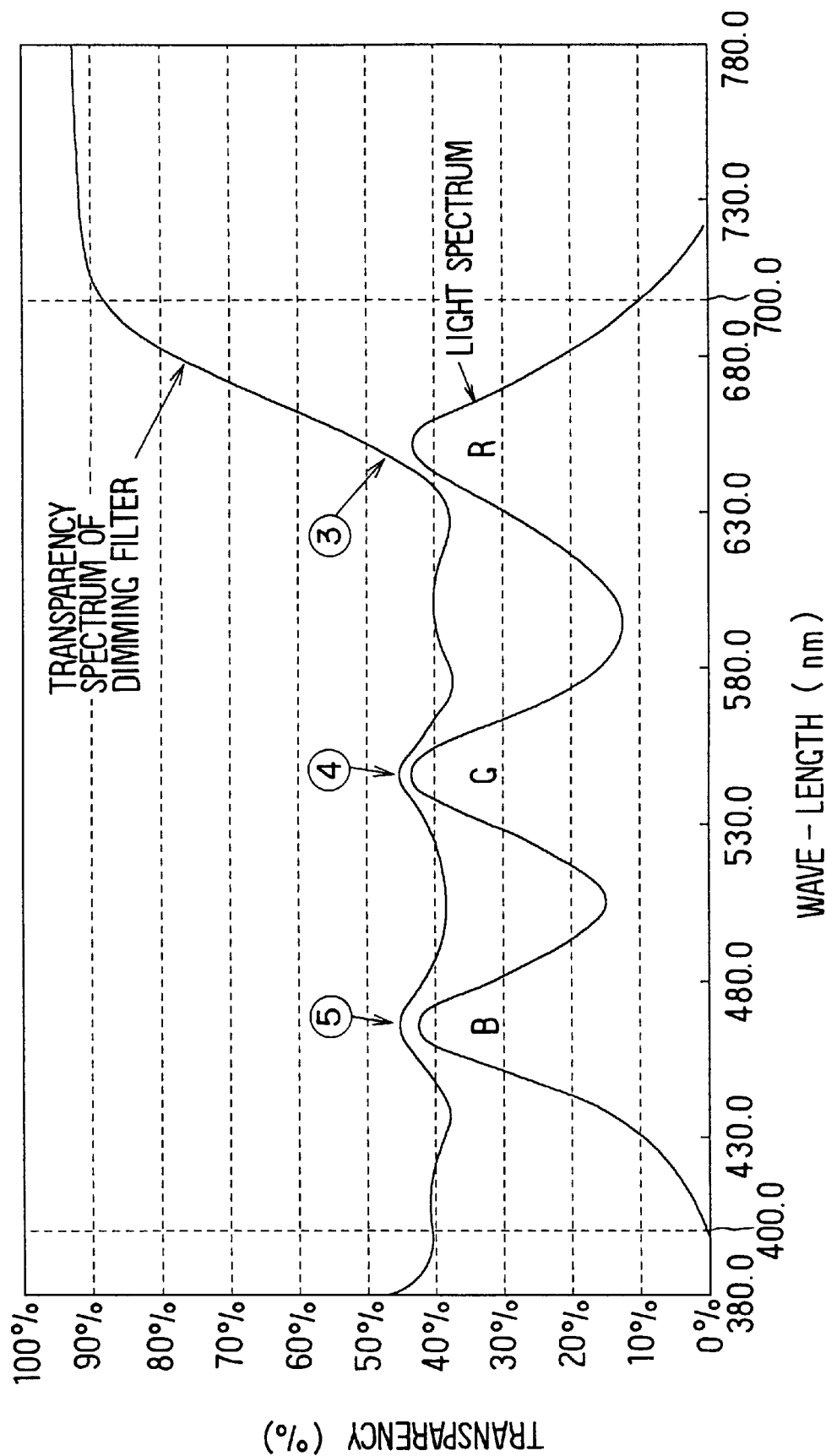
FIG. 8 is a graph showing a transparency spectrum of a dimming filter to be used for a combined display panel having a multi-color second display panel and a light spectrum of the multi-color second display panel.

When a full color display panel having red, green and blue filters is used as the second display panel, a dimming filter having such a transparency characteristic as shown in FIG. 8 is used. In this case, the light spectrum of the second display panel 2 emitted through the color filters has three peaks in red, green and blue light regions (R, G and B in the graph of FIG. 8). Transparency of the dimming filter is made high in the regions corresponding to the peaks of the light spectrum of the second display panel 2. In other words, the transparency is made higher than an average transparency of a whole visible light in three regions, i.e., red, green and blue light regions (③, ④ and ⑤ in the graph of FIG. 8). Thus, relatively low luminance of the second display panel 2 is compensated and the color shift of the first display panel 1 is avoided at the same time.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A combined display panel comprising:
a first display panel;
a second display panel having a lower luminance than the first display panel and emitting monochrome light, the second display panel being combined with the first display panel; and
a dimming filter covering a whole display surface of the combined display panel, wherein:
transparency of the dimming filter is made high in wave-length regions corresponding to a wave-length region of light emitted from the second display panel and a wave-length region of light having a color which is complementary to a color of the light emitted from the second display panel.

2. The combined display panel as in claim 1, wherein:
the transparency of the dimming filter made high in both regions is higher than an average transparency in a wave-length region covering whole visible light.

3. The combined display panel as in claim 1, wherein:
the transparency of the dimming filter made high in both regions is substantially at a same level.

4. The combined display panel as in claim 1, wherein:
the second display panel includes color filters for displaying color images.

5. The combined display panel as in claim 1, wherein:
the second display panel is a transparent electroluminescent panel and is overlapped on a part of the first display panel.

6. The combined display panel as in claim 1, wherein:
the second display panel is a non-transparent electroluminescent panel and is mounted on the first display panel at a place where a display of the first display panel is shown without being covered by the the second display panel.

7. A combined display panel comprising:
a first display panel;
a second display panel having a lower luminance than the first display panel, the second display panel being combined with the first display panel; and
a dimming filter covering a whole display surface of the combined display panel, wherein:
the second display panel includes color filters for displaying color images; and
transparency of the dimming filter is made higher in a wave-length region corresponding to a wave-length region of light emitted through at least one of the color filters.

8. The combined display panel as in claim 7, wherein:
the transparency of the dimming filter made high in the regions is higher than an average transparency in a wave-length region covering whole visible light.

9. A combined display panel comprising:
a first display panel;
a second display panel having a lower luminance than the first display panel and emitting light having a color different from a color of the light emitted from the first display panel; and
a dimming filter covering a whole display surface of the combined display panel; wherein:
transparency of the dimming filter is made higher in a wave-length region corresponding to a wave-length region of light emitted from the second display panel to suppress a luminance decrease of the second display panel due to the dimming filter; and
the transparency of the dimming filter is made higher also in a wave-length region of light having a color which is complementary to a color of the light omitted from the second display panel to suppress a color shift in the light emitted from the first display panel.

10. A combined display panel as in claim 9, wherein:
the second display panel emits light having plural colors different from each other.

11. The combined display panel as in claim 9, wherein:
the second display panel includes color filters for emitting light having plural colors different from each other.

* * * * *